United States Patent
Greenberg et al.

[11] Patent Number: 6,072,897
[45] Date of Patent: Jun. 6, 2000

[54] DIMENSION ERROR DETECTION IN OBJECT

[75] Inventors: Gad Greenberg, Tel-Aviv; Yair Eran, Rehovot; Amnon Joseph, Petach Tikva, all of Israel

[73] Assignee: Applied Materials, Inc., Santa Clara, Calif.

[21] Appl. No.: 08/933,104

[22] Filed: Sep. 18, 1997

[51] Int. Cl.[7] .............................. G06K 9/46; G06K 9/64; G06T 7/60

[52] U.S. Cl. .......................... 382/144; 382/149; 382/286

[58] Field of Search .................... 382/144, 147, 382/145, 148, 149, 151, 199, 218, 219, 286, 291; 348/87, 126; 364/468.17; 702/82, 159; 356/384, 390, 394, 237.4, 237.5; 250/559.26, 559.39, 559.46

[56] References Cited

U.S. PATENT DOCUMENTS

| | | | |
|---|---|---|---|
| 4,392,120 | 7/1983 | Mita et al. | 382/22 |
| 4,500,202 | 2/1985 | Smyth | 356/237 |
| 4,547,895 | 10/1985 | Mita et al. | 382/8 |
| 4,579,455 | 4/1986 | Levy et al. | 356/394 |
| 4,661,984 | 4/1987 | Bentley | 382/8 |
| 4,776,022 | 10/1988 | Fox et al. | 382/8 |
| 4,790,023 | 12/1988 | Matsui et al. | 382/8 |
| 4,830,497 | 5/1989 | Iwata et al. | 356/394 |
| 4,866,782 | 9/1989 | Sugie et al. | 382/22 |
| 4,926,489 | 5/1990 | Danielson et al. | 382/144 |
| 5,012,523 | 4/1991 | Kobayashi et al. | 382/8 |
| 5,272,761 | 12/1993 | Kanai et al. | 382/8 |
| 5,367,467 | 11/1994 | Sezaki et al. | 364/489 |
| 5,384,711 | 1/1995 | Kanai et al. | 364/489 |
| 5,475,766 | 12/1995 | Tsuchiya et al. | 382/144 |
| 5,781,656 | 7/1998 | Hagino et al. | 382/144 |
| 5,781,657 | 7/1998 | Masuda | 382/147 |
| 5,804,340 | 9/1998 | Garza et al. | 430/5 |
| 5,849,440 | 12/1998 | Lucas et al. | 430/5 |
| 5,917,934 | 6/1999 | Chiu et al. | 382/149 |
| 6,005,966 | 12/1999 | Scaman | 382/149 |

*Primary Examiner*—Leo H. Boudreau
*Assistant Examiner*—Brian P. Werner
*Attorney, Agent, or Firm*—McDermott, Will & Emery

[57] ABSTRACT

In a system for real-time inspection of patterns formed on a base, the pattern including surfaces and edges. The system provides for a detector that includes: (i) two input channels for receiving streams of pixels representing the patterns. Each pixel representing the surface and/or edge of the pattern in sub-pixel boundary, (ii) two line width measurement devices being responsive to the streams of pixels for processing in real time the pixels in a manner that corresponds to a predetermined direction in the patterns, so as to measure, in sub-pixel boundary, line width data between two edges. This measurement is effected by executing the following steps: (i) detecting an opening edge, (ii) successively updating line width; and (iii) providing a line width measurement in response to detecting a closing edge. The detector further includes comparator being responsive to the line width data delivered from the two line width measurement devices, for comparing the line width data and obtaining difference between them, so as to generate a defect\no defect indication depending upon the difference.

53 Claims, 9 Drawing Sheets

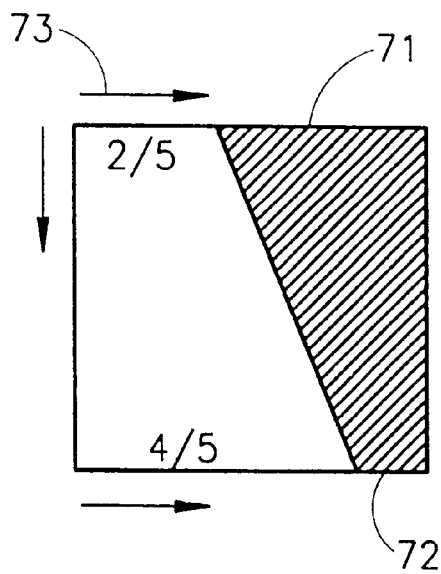
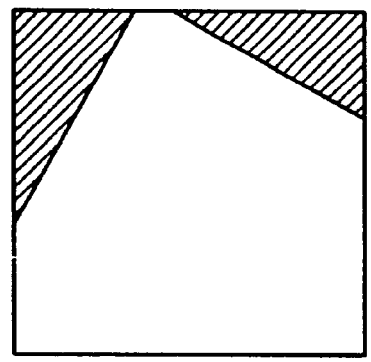
FIG.5A          FIG.5B
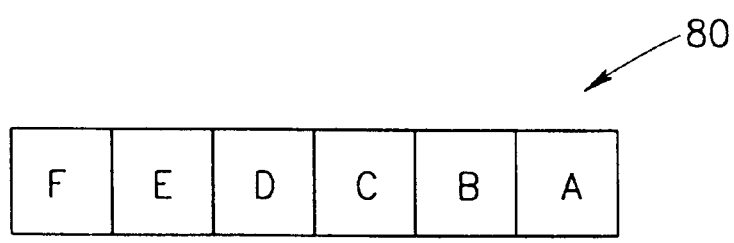
FIG.5C

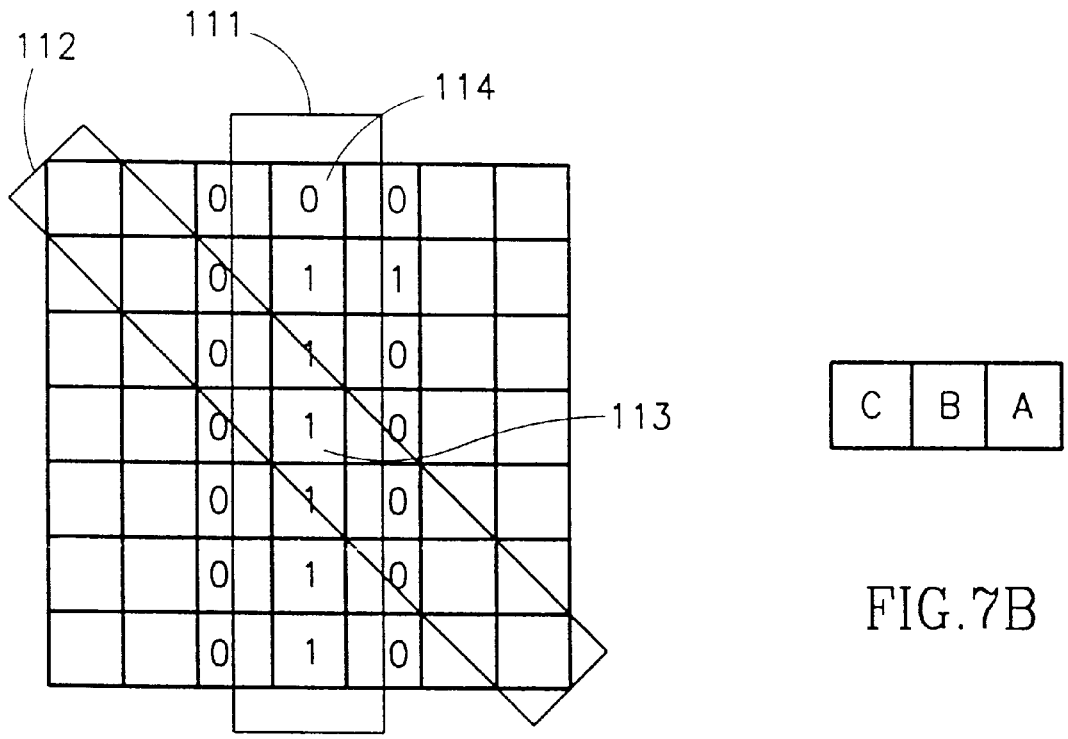
FIG.7B
FIG.7A
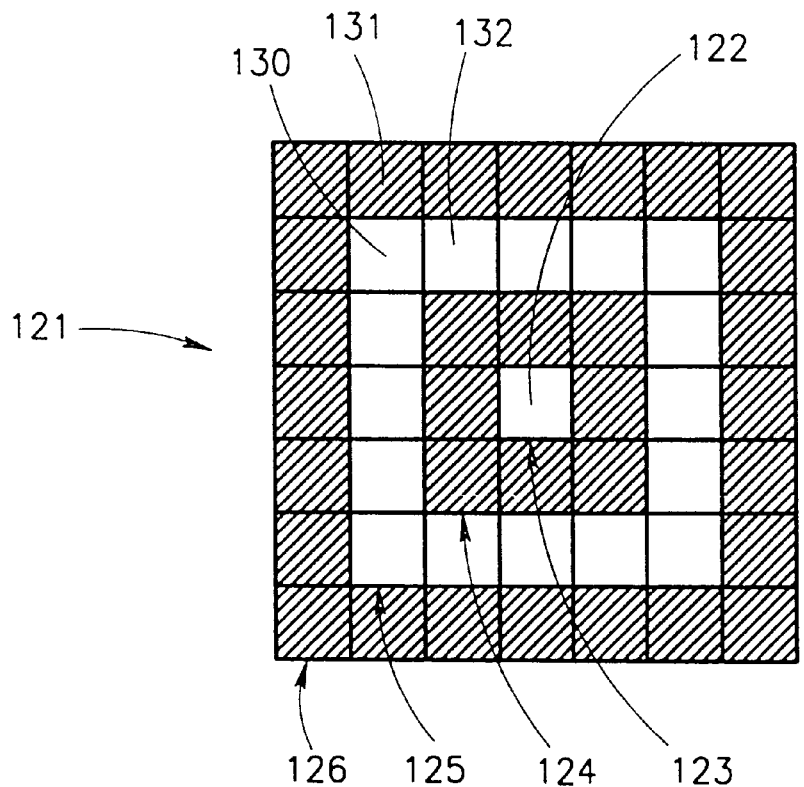
FIG.8

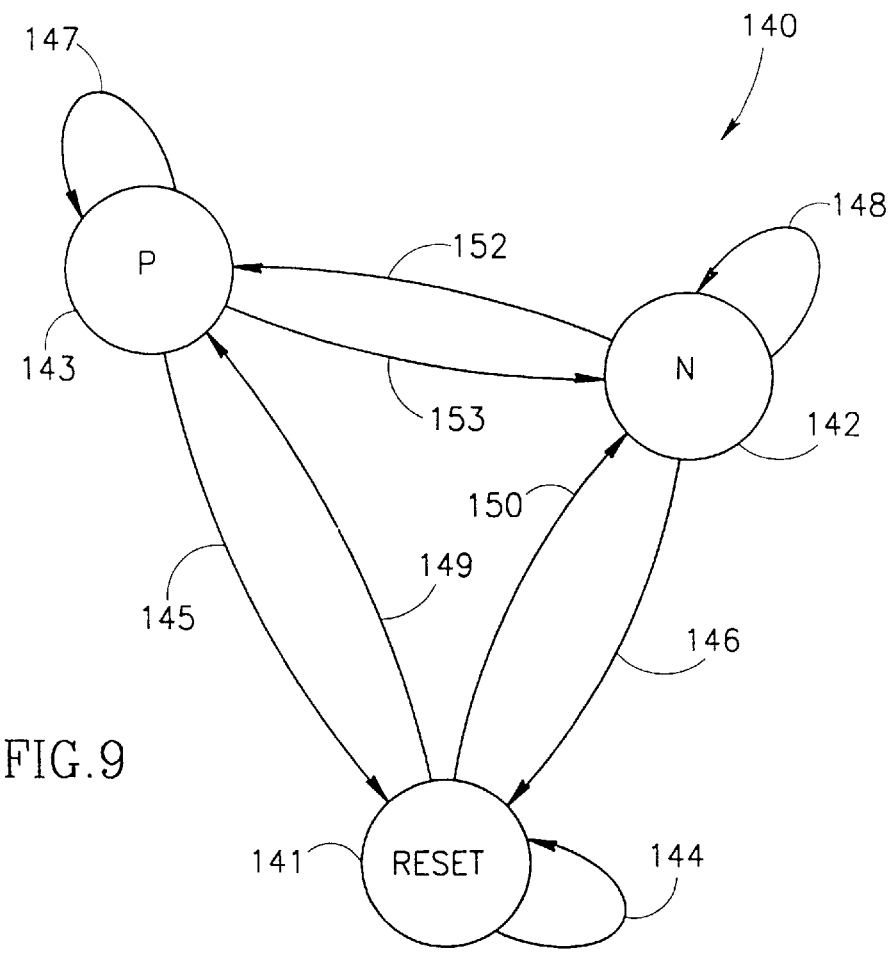
FIG.9
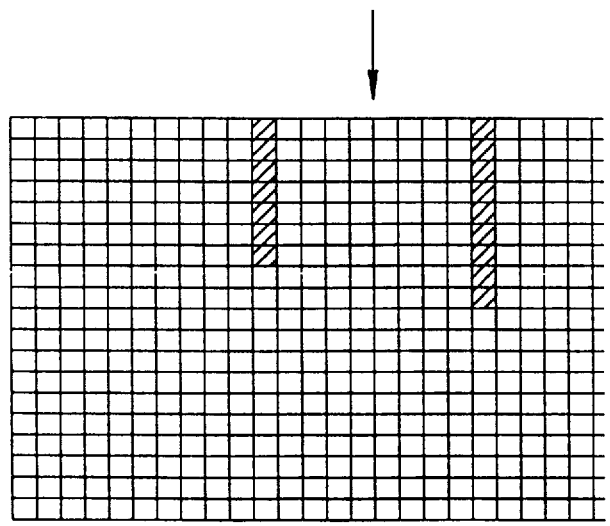
FIG.10 *PRIOR ART*

The present invention is in the general field of reticle quality inspection.

DIMENSION ERROR DETECTION IN OBJECT

FIELD OF THE INVENTION

The present invention is in the general field of reticle quality inspection.

BACKGROUND OF THE INVENTION

The significance of line width control in mask production has become greater with decreasing tolerable defect size. An exemplary defect that adversely affects the quality of a reticle is illustrated schematically in FIG. 1. Methods used for controlling line width dimensions in masks for sub micron devices are known in the art. Thus, by way of example, U.S. Pat. No. 4,392,120 to Kikuo et al. discloses a system, for inspecting a pattern formed on a base such as a photo-mask, by means of laser beam scanning, which includes a device for detecting the body and edges of the pattern. A memory device having a plurality of memory units for separately storing the detected body and plurality of edges of the pattern, a device for measuring the width of the body of the pattern between two parallel edges of the pattern, a device for detecting and correcting missing pattern edges, a device for inverting the pattern, a device for reducing the pattern and a device for eliminating pinholes and stains within a pattern. The system of Kikuo et al. has several significant shortcomings. For one, it enables to detect edges only in predetermined orientations. As is clearly shown in FIG. 5 of the Kikuo et al. patent, in order to measure the width between edges, data obtained on the entire relevant environment must be stored. Storing the entire environment, at the required resolution poses undue constraints on the processor which must operate in real time. Thus, in order to reduce the volume of data that should be processed in real-time, the Kikuo et al. patent produces images of low resolution, which of course adversely affects the accuracy of the resulting line width measurements.

Another reticle inspection system is disclosed in U.S. Pat. No. 5,563,702, and the basic concept of inspection is based on line width measurement device as described in columns 15 and 16 of the '702 patent. The system of the '702 patent share significant shortcomings of the hitherto known devices, as described above.

Accordingly, there is a need in the art for a new detector which affords reticle quality inspection based on revealing line width errors. There is yet further need in the art for a detector capable of measuring in real time and in high accuracy, short and long lines, which the case may be. The detector may be incorporated e.g. into a die-to-die, die-to-database inspection systems and others.

SUMMARY OF THE INVENTION

It should be noted that whilst, for simplicity, the description below focuses in hardware realization, those versed in the art will readily appreciate that the invention is by no means bound by hardware realization, and, accordingly, some or all of the elements that constitute the system of the invention may be partially or fully be realized in software.

It should be further noted that in the context of the invention, real-time processing means that the rate of input data fed to the detector device of the invention is essentially the same as the rate of output delivered from the detector. This, however, does not imply that the input and output rate are exactly the same.

The basic data element unit which the detector of the invention processes is a pixel. This, however, is not obligatory. High accuracy, or high resolution means, a resolution higher than the sampling resolution (normally, in sub-data element resolution, or in the preferred embodiment sub-pixel resolution).

As is well known, a typical die-to-database system utilizes two channels which are coupled to a comparator. Broadly speaking, the first channel hereinafter scan channel) serves for feeding the comparator with a succession of scanned images that are acquired from the inspected reticle. The second channel (hereinafter reference channel) feeds the comparator with corresponding data which are derived from an essentially defectless, reference design database. There being no limit as to the specific format or formats in which data (indicative of defectless, or essentially defectless, patterns are held). The comparator compares the inputs from both channels and, in the case of a discrepancy that exceeds a threshold, the comparator outputs an appropriate error signal indicating the presence of a defect in the reticle (or portion thereof).

In the die-to-die system both channels are fed with data that originate from the inspected reticle, there being no reference design database. The underlying premise on which the die-to-die system is based is that a reticle consists of a repetition of identical patterns i.e. identical dies (or in a cell-to-cell system identical cells). It is assumed that defects are random so that a particular defect occurring in a given pattern does not appear in any other instance thereof in the same reticle. The data of the two channels are fed to a known per se decision module which on the basis of a series of results previously obtained on a number of instances of the same pattern and stored in its memory is capable of recognizing a defective pattern.

There is also known in the art the Mask-to-Mask system, which resembles to a large extent the die-to-die and cell-to-cell systems except for the fact that the data are fed to the system from two separate masks.

The system and method of the present invention are applicable to die-to-database, die-to-die, cell-to-cell, mask-to-mask systems as well as other types of systems. For simplicity, the description below refers to die-to-database system, but those versed in the art will readily appreciate that it applies, mutatis mutandis, also to the specified variants. Thus, for example, in the description below, when using the terms "scan channel" or "reference channel" in connection with a die-to-database system, in a counterpart die-to-die system the "reference channel" does not necessarily deliver defectless reference data.

It has long been known that edge detection techniques may be exploited for detecting defects in inspected reticles. Edges in this connection are boundaries between two regions having different characteristics of light transmittance. In the binary case, (i.e. a reticle represented as a combination of '1's and '0's), any edge constitutes a boundary between opaque and transparent surfaces of the reticle.

Generally speaking, according to the invention, the distance between opposite edges (i.e. the line width) in the inspected reticle is measured and compared with corresponding reference values taken from a design database. When the difference between the respective distance measurements of the inspected reticle and the reference design data exceeds a threshold, a defect is announced.

FIG. 2 illustrates, schematically, three distance measurements (2, 3 and 4) in a portion of a defective reticle corresponding to three distance measurements (2', 3' and 4') in a portion of a fault-free design, reticle. As shown, the defect in the middle section of the reticle portion gives rise to a relatively narrow section which results in a large difference between the line widths 3 and 3'.

In order to accomplish accurate measurements and avoid spurious defect indications, the detector of the invention utilizes one or more of the following novel techniques, all of which are explained in greater detail below:

utilization of both intra-pixel data containing the locations of edges and inter-pixel data containing the location of edges and corners in near pixels;

utilization of hardware (software or combination thereof) capable of measuring, in real time, short and long line widths between opposite edges whilst maintaining high accuracy of the measured line width;

utilization of filtering techniques to filter-out artefactual discrepancies between the reference design data and the real inspected data, such as errors due to "local" and dynamic phenomena, e.g. distortions in the images of the inspected reticle due to drifts in the optical system used to acquire the images;

identification of the geometrical characteristics of each measurement and using this information in evaluating the measurements. It is thus possible to determine whether a difference in measurement constitute an error or not, by considering the geometry of the pattern. For example, maximum tolerable line width differences between the reticle and the design database decreases as the dimensions of the examined entities become smaller. In other words, in this example, the narrower the line, the lower is the threshold value of unallowed deviations. As another example, a "corner rounding effect" exists in the reticle, so that measurements at corners are less accurate than long straight lines. The invention allows measurements at neighboring corners to be ignored or evaluated with a higher threshold value.

Accordingly, the invention provides for, in a system for real-time inspection of patterns formed on a base, the pattern including surfaces and edges, a detector comprising:

at least two input channels for receiving respective streams of data elements representing said patterns, each data element representing at least surface and/or edge of said pattern in high resolution;

at least two line width measurement devices being responsive to at least said respective streams of data elements, for successively processing, in real time, said data elements in a manner that corresponds to a given direction in said patterns, so as to measure, in high resolution, line width data between two edges by executing at least the following steps: (i) detecting an opening edge, (ii) successively updating line width; (iii) providing a line width measurement in response to detecting a closing edge;

at least one comparator being responsive to at least the line width data delivered from said at least two line width measurement devices, for comparing said line width data and obtaining a difference therebetween, so as to generate a defect\no defect indication depending upon at least said difference.

The invention further provides for, in a system for real-time inspection of patterns formed on a base, the pattern including surfaces and edges, a detector comprising:

at least two input channels for receiving respective streams of data elements representing said patterns, each data element representing at least surface and/or edge of said pattern in high resolution;

at least two line width measurement devices being responsive to at least said respective streams of data elements, for successively processing, in real time, said data elements in a manner that corresponds to a given direction in said patterns, so as to measure, in high resolution, line width data between two edges;

at least one comparator being responsive to at least the line width data delivered from said at least two line width measurement devices, for comparing said line width data and obtaining a difference therebetween;

local environment biasing means capable of generating a bias signal that depends upon a series of said differences between line width data;

said at least one comparator being capable of generating a defect\no defect indication depending upon at least said difference and said bias value.

The invention still provides for, in a system for real-time inspection of patterns formed on a base, the pattern including surfaces and edges, a detector comprising:

at least two input channels for receiving respective streams of data elements representing said patterns, each data element representing at least surface and/or edge of said pattern in high resolution; the edge representation constituting an intra data element representation;

a feature data element input channel, for receiving streams of feature data elements representing said patterns, each feature data element representing at least surface and/or edge of said pattern, in high resolution, based on at least location of edges in feature data elements residing in the vicinity of said feature data element; the edge representation constituting an inter data element representation;

at least one matcher device, responsive to at least said stream of data elements and stream of feature data elements, for outputting a stream of respective matched data elements and feature data elements;

at least two line width measurement devices being responsive to at least said respective streams of matched data elements and feature data elements, for successively processing, in real time, said data elements and said feature data elements in a manner that corresponds to a given direction in said patterns, so as to measure, in high resolution, line width data between two edges;

at least one comparator being responsive to at least the line width data delivered from said at least two line width measurement devices, for comparing said line width data and obtaining a difference therebetween, so as to generate a defect\no defect indication depending upon at least said difference.

The invention still further provides for, in a system for real-time inspection of patterns formed on a base, the pattern including surfaces and edges, a method for detecting defects in said patterns, comprising:

(a) receiving, in at least two input channels, respective streams of data elements representing said patterns, each data element representing at least surface and/or edge of said pattern in high resolution;

(b) processing, in real time, said data elements in a manner that corresponds to a given direction in said patterns, so as to measure, in high resolution, line width data between two edges by executing at least the following steps:

(i) detecting an opening edge.
  (ii) successively updating the line width;
  (iii) providing a line width measurement in response to detecting a closing edge;

(c) comparing said line width data and obtaining a difference therebetween, so as to generate a defect\no defect indication depending upon at least said difference.

The invention yet still further provides for, in a system for real-time inspection of patterns formed on a base, the pattern including surfaces and edges, a method for detecting defects in said patterns, comprising:

(d) receiving, in at least two input channels, respective streams of data elements representing said patterns, each data element representing at least surface and/or edge of said pattern in high resolution;

(e) processing, in real time, said data elements in a manner that corresponds to a given direction in said patterns, so as to measure, in high resolution, line width data between two edges;

(f) comparing said line width data and obtaining a difference therebetween;

(g) generating a bias signal that depends upon a series of said differences between line width data; and (h) generating a defect\no defect indication depending upon at least said difference and said bias value.

Still further, the invention provides for, in a system for real-time inspection of patterns formed on a base, the pattern including surfaces and edges, a method for detecting defects in said patterns, comprising:

(i) receiving, in at least two input channels, respective streams of data elements representing said patterns, each data element representing at least surface and/or edge of said pattern in high resolution; the edge representation constituting an intra data element representation;

(j) receiving streams of feature data elements representing said patterns, each feature data element representing at least surface and/or edge of said pattern, in high resolution, based on at least location of edges in feature data elements that reside in the vicinity of said feature data element; the edge representation constituting an inter data element representation;

(k) outputting a stream of respective matched data elements and feature data elements;

(l) processing, in real time, said data elements and said feature data elements in a manner that corresponds to a given direction in said patterns, so as to measure, in high resolution, line width data between two edges; and (m) comparing said line width data and obtaining a difference therebetween, so as to generate a defect\no defect indication depending upon at least said difference.

As will be explained in greater detail below, comparator may include e.g. a combiner module.

BRIEF DESCRIPTION OF THE DRAWINGS

For a better understanding, the invention will now be described, by way of example only, with reference to the accompanying drawings, in which:

FIGS. 5a–c illustrate intra-pixel representations of edges in connection with a "convert to segment format" module of FIG. 4;

FIGS. 7a–b illustrate a scheme that assists in clarifying the operation of the feature detector module and data structure that pertains to inter-pixel data representation;

FIG. 8 illustrates a 7 by 7 span of an environment of feature pixels, which serves for explaining the operation of a matcher module forming part of the detector of FIG. 4;

FIG. 9 illustrates, schematically, a state machine architecture that constitutes any one of the line width measurement modules in a detector of FIG. 4;

FIG. 10 illustrates a dump memory representation in connection with line width measurement in a system according to the prior art;

DESCRIPTION OF SPECIFIC EMBODIMENTS

Figure 1:
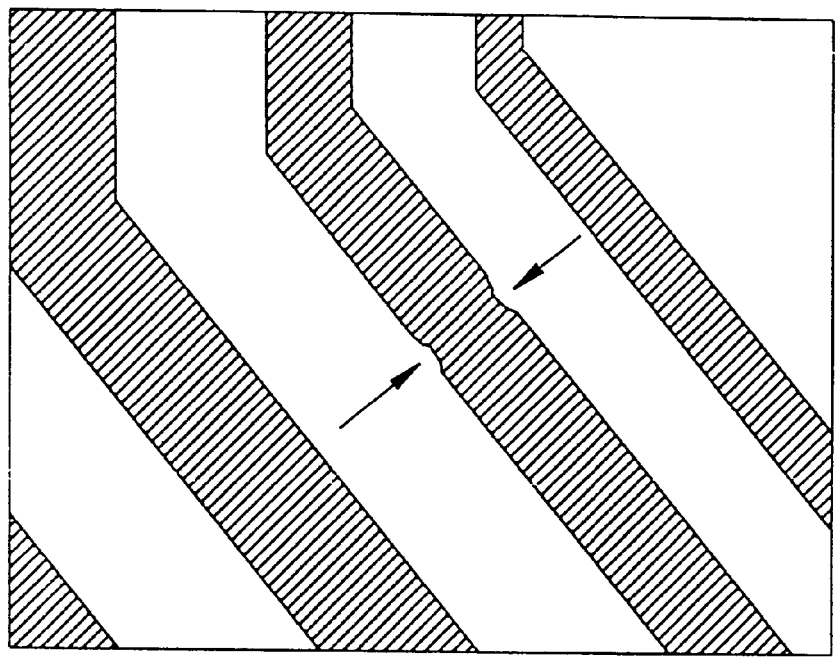
FIG. 1 illustrates, schematically, a portion of an inspected reticle with minor width variation defects.
Figure 2:
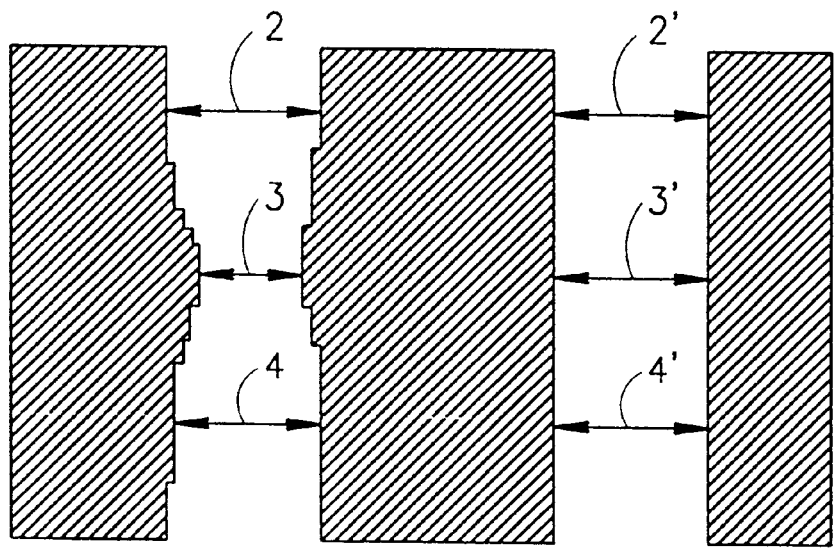
FIG. 2 illustrates, schematically, discrepancies between respective patterns originating from an inspected reticle and a corresponding design database.
Figure 3:
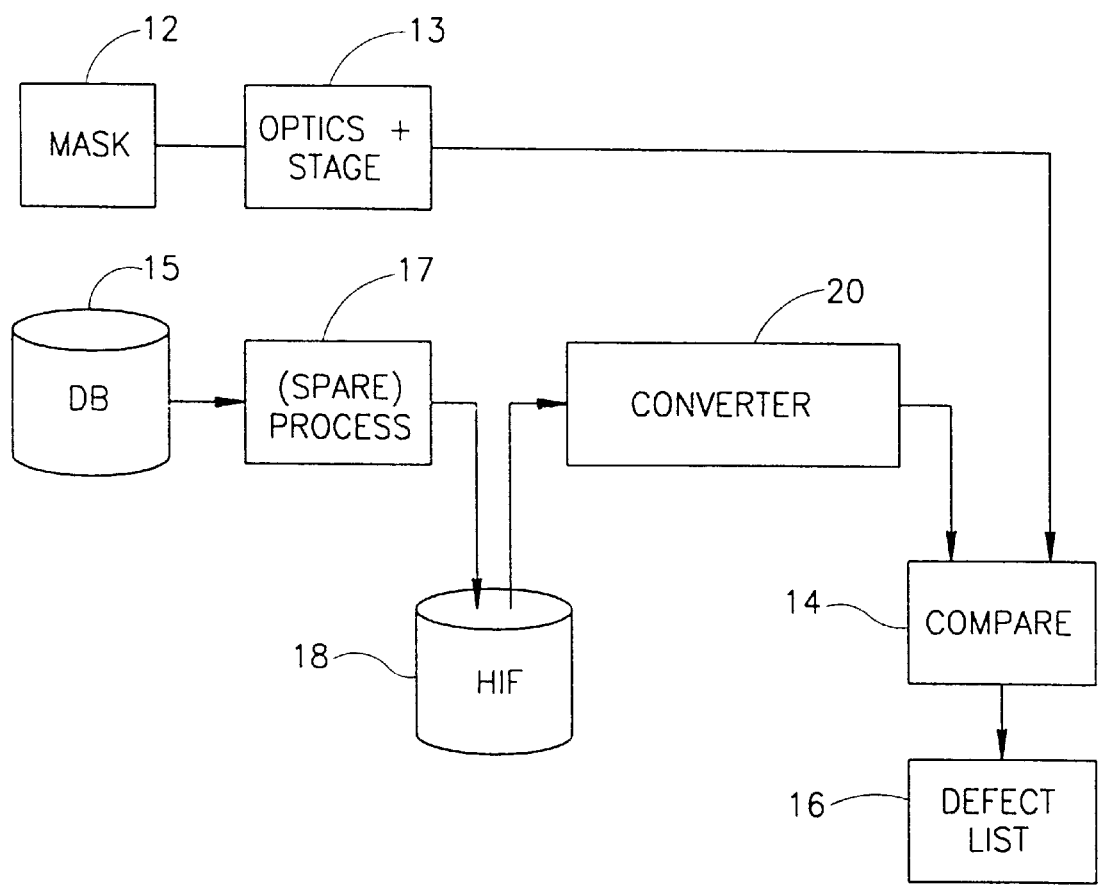
FIG. 3 is a schematic illustration of a typical die-to-database reticle inspection system.

Attention is first directed to FIG. 3 showing a schematic illustration of a typical reticle inspection system. The structure of the system is described herein for completeness of description only and a far more detailed discussion can be found in co-pending PCT application no. PCT/IL 97/00226. Those versed in the art will readily appreciate that the detector of the invention is, by no means, bound by the structure of the specific inspection system illustrated in FIG. 3, and accordingly it can be incorporated into other systems, all as required and appropriate, depending upon the particular application. Thus, FIG. 3 illustrates an optical inspection system in which a mask 12 (or other object such as a reticle or wafer produced by an image of the reticle) is inspected by an optical system, schematically indicated at 13, which outputs image pixels corresponding to the inspected mask. These pixels are compared in a comparator system 14 (which includes the detector according to the invention) with pixels derived from a design database 15 representing a defectless or reference mask. Mismatches or discrepancies between the inspection-derived object pixels and the database-derived design pixels are outputted by the comparator system 14 in the form of a defect list 16.

The reference data in the database 15 may be stored in one of the standard formats, such as GDSII, JEOL, Hitachi, MEBES, and the like. Such data normally includes a BGF representation of the various patterns that constitute a frame as well as graphic transformations that should be applied to the BGFs. The compact data is converted in an off-line pre-processor 17, before the inspection starts, to a counterpart HIF (Hierarchical) compact data format file 18.

Transformations which cannot be done in real time, or processing steps which need to process all of the data as a unit in order to achieve a result (for example, reversing and sizing), are done in preprocessor 17. These operations are executed at the pattern level, so pattern arraying is still maintained, and, in general, compaction lost during an operation such as reversing can be recovered, and in some cases even improved. The resulting file called HIF 18 contains multiple instances of multiple patterns.

The system illustrated in FIG. 3 includes a data converter, generally designated 20, that is constructed for converting the data in the compact format of HIF file 18 into a real-time expanded format that corresponds to the series of pixels which is compared to the series of pixels representing of the inspected object. The expanded format presents the data to the comparator system 14 approximately at the same rate as the object data from the optical inspection system 13, in order to enable the streams of data to be compared in real time. In order to maintain essentially the same rate in the manner specified, comparator 14 utilized synchronization unit, if necessary.

Figure 4A:
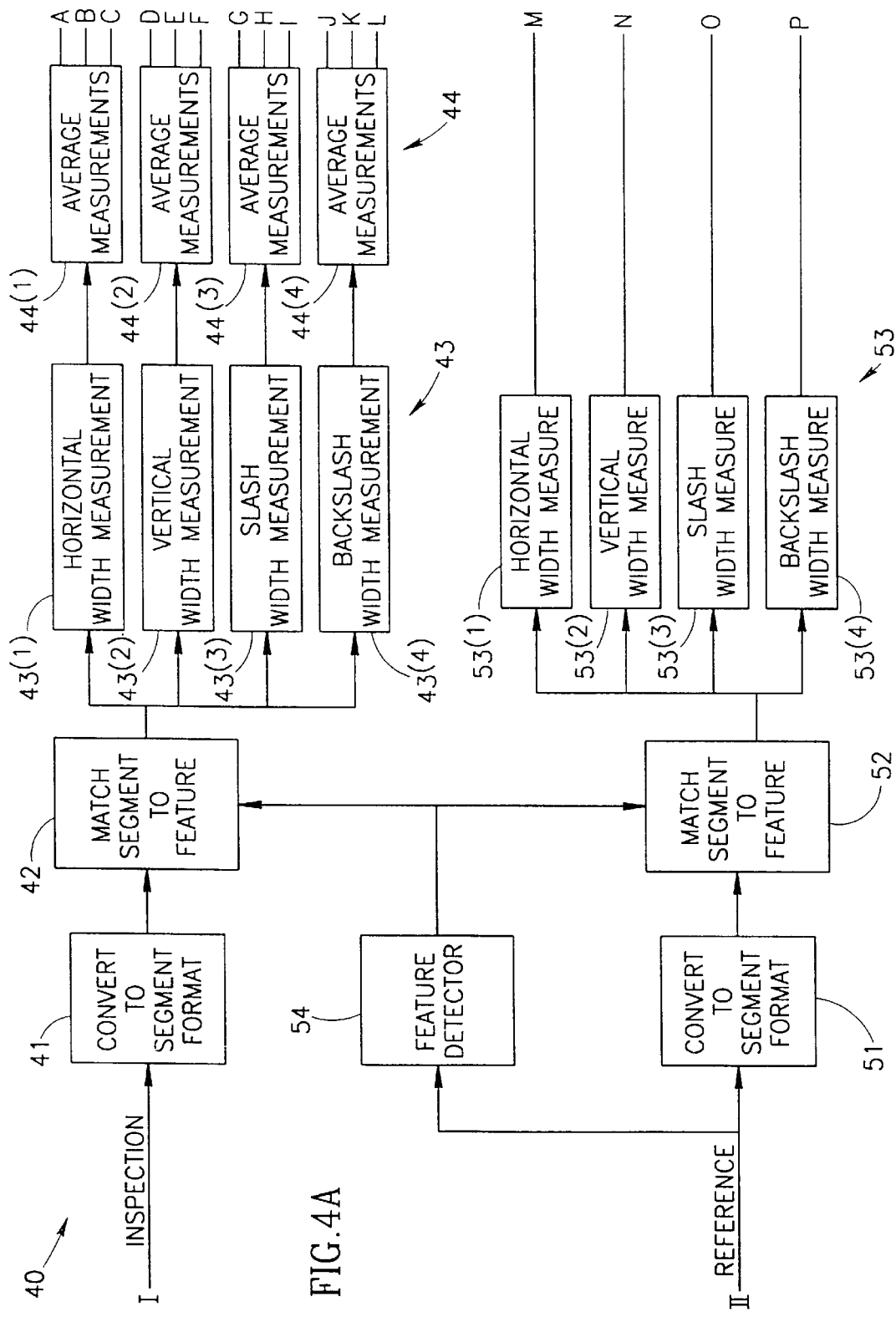
FIGS. 4A–B is a generalized block diagram of a detector according to the invention.
Figure 4B:
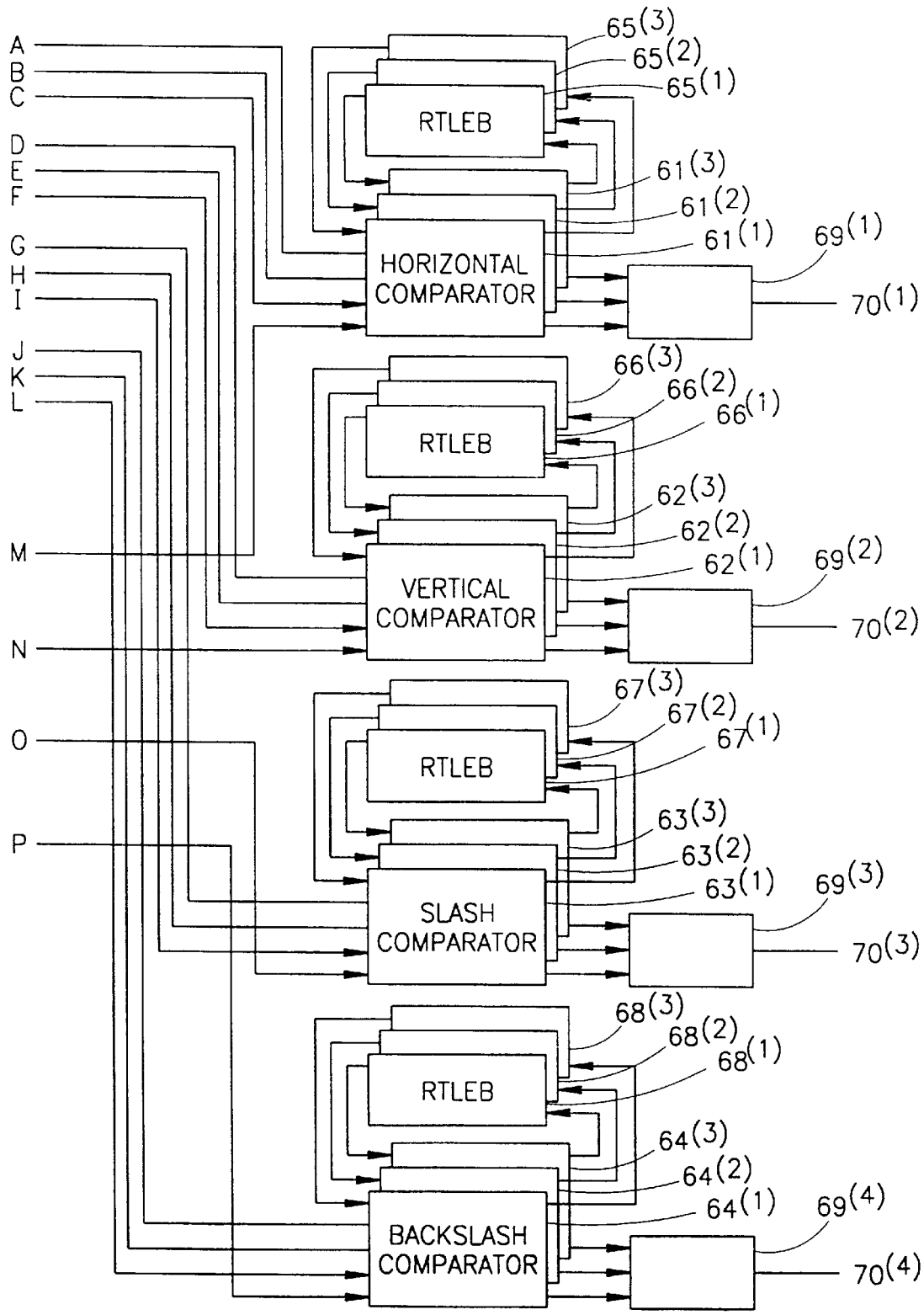

Turning now to FIGS. 4a–b, there is shown a generalized block diagram of a detector 40 according to the invention. The detector 40 generally performs the function of the compare module 14 of FIG. 3. Thus, output images that correspond to a segment of the inspected reticle are fed as a stream of pixels to "convert to segment format module" 41 and, likewise, a stream of pixels that originates from the design data (being indicative of a fault-free reticle) is fed to "covert to segment format module" 51.

Generally speaking, the processing of input pixels is performed in two separate channels, i.e. a scan channel which deals with data originating from the actual inspected reticle and a data reference channel that deals with data originating from a design database.

The scan channel includes the modules designated, generally, as 41, 42, 43 and 44 whereas the reference channel includes the modules, designated generally as 51, 52, 53 and 54.

The processed data from both channels is then fed to a comparator module designated generally as 60. As shown in FIG. 4b, the comparator module included various sub-modules the operation of which will be explained in greater detail below.

Modules 41 and 51 convert the different pixel formats of the scan channel input and the reference channel input into a common format (hereinafter segment format) which facilitates comparison in later stages. Basically, the segment format describes each pixel by the edge(s) that pass through the pixel. This information is referred to as intra-pixel data or segment pixel data.

The "Feature detector" module 54 provides information about pixels in the vicinity of the pixel under question, e.g. "how close is the pixel under question to a corner edge". This information is referred to as inter-pixel data or feature pixel data, By the specific embodiment of FIGS. 4a–b, the feature pixel data originated from the reference design data.

To sum-up, each pixel is described in terms of a segment pixel data constituent (containing intra-pixel data) and feature pixel data constituent (containing inter-pixel data).

Having obtained inter-pixel and intra-pixel data, the data are fed to "match segment module" 42 for matching the intra-pixel data to its corresponding inter-pixel data. The feature pixel data is fed also to "match segment module" 52. In this connection it should be noted that the data from the "feature detector module" is only approximately synchronized with the data from the "convert to segment module". In other words, the segment pixel data and the feature pixel data constituents of a given pixel are normally not fully synchronized, i.e. they are not delivered from modules 42 and 54 simultaneously. It is assumed however that there is some degree of synchronization which assures that the segment pixel data constituent is only slightly delayed or slightly precedes its mating feature pixel constituent.

On the basis of matched inter-pixel and intra-pixel data, a line width measurement procedure is used for measuring the line width between opposite edges. As before, this task is performed separately for the scan channel data and the reference channel data in modules 43 and 53, respectively.

As shown in FIG. 4b, and as will be explained in greater detail below, the line width measurement is performed independently in four separate directions, each measurement having associated therewith a measurement quality grading (referred to also as its geometrical characteristics). As explained before, the measurement quality grading enhances the sensitivity of the comparison. Thus, the discrepancy between the line width measurements of the inspected reticle and the reference design data is sensitive to the specified grading. Put differently, a given difference may be classified in one scenario as "defect" and in other scenario as "tolerable error", depending upon the respective measurement quality grading.

By one specific embodiment, measurement quality grading relies on the following parameters:

Proximity of the edges to a corner. Due to the inherent inaccuracies at corners, a larger discrepancy is tolerated at edges near corners;

The extent to which opposite edges are parallel. The more perfectly parallel the edges, the smaller the tolerated error;

The line width per se. By way of non limiting example, the narrower the line width, the smaller the tolerated error. By this particular example, a smaller difference is expected when evaluating the line of a given conductor, as compared to its length.

"Line orientation" i.e. the angle of the edge relative to the processing direction. For example, when the edge is normal to the processing direction a small difference is tolerated.

Those versed in the art will readily appreciate that the specified quality gradings are, by no means, binding and accordingly one or more of the specified quality gradings may be amended or deleted, and/or others may be added, all as required and appropriate, depending upon the particular application.

By the specific embodiment of FIGS. 4a–b, modules 43 and 53 are composed each of four separate sub-modules each operating independently. Each sub-module is responsible for conducting measurements in a different direction. Thus, sub-modules $43^{(1)}$, $43^{(2)}$, $43^{(3)}$ and $43^{(4)}$ measure line width oriented in a horizontal, vertical, slash and backslash direction, respectively, and the same applies to sub-modules $53^{(1)}$, $53^{(2)}$, $53^{(3)}$ and $53^{(4)}$ in the reference channel.

Module 44, which relates solely to the scan channel, aims at coping with the so called edge roughness phenomenon by averaging the measurement and quality grading outputted from line width measurement module 43, over e.g. 3 and 5 consecutive pixels.

Module 60 performs a comparison between measurements delivered from the scan channel processing and those delivered from the reference channel processing. Obviously, the comparison is performed with respect to each direction separately. Thus sub-module $61^{(1)}$ is fed with measurement data from horizontal sub-modules $43^{(1)}$ and $53^{(1)}$ and indicates whether the discrepancies are tolerable or otherwise constitute a defect. As explained above, the latter decision is based inter alia on the respective measurement quality grading data.

Modules $61^{(2)}$ and $61^{(3)}$ are, likewise, fed with averaged measurements produced by sub-module $44^{(1)}$.

Sub-module groups $62^{(1)}$, $62^{(2)}$ and $62^{(3)}$; $63^{(1)}$, $63^{(2)}$ and $63^{(3)}$ and $64^{(1)}$, $64^{(2)}$ and $64^{(3)}$ perform, independently, a similar task with respect to the respective "vertical", "slash" and "backslash" measurements.

As shown, each sub-module further includes three real-time-local-environment-bias (RTLEB) sub-modules ($65^{(1)}$, $65^{(2)}$ and $65^{(3)}$; $66^{(1)}$, $66^{(2)}$ and $66^{(3)}$; $67^{(1)}$, $67^{(2)}$ and $67^{(3)}$; and $68^{(1)}$, $68^{(2)}$ and $68^{(3)}$) for filtering out artefactual discrepancies between the reference design data and the real inspected data. The operation of the RTLEB module will be explained in greater detail below. The comparator sub-modules of the horizontal direction $61^{(1)}$, $61^{(2)}$ and $61^{(3)}$, deliver their output to combiner sub-module $69^{(1)}$ which combines the data (as will be explained in greater detail below) so as to give rise to output $70^{(1)}$ providing a defect/no defect indication. The other comparators of the vertical, slash and backslash directions are likewise coupled to respective combiner sub-modules $69^{(2)}$, $69^{(3)}$ and $69^{(4)}$ giving rise to outputs $70^{(2)}$, $70^{(3)}$ and $70^{(4)}$.

Having described, generally, the structure of the detector, there now follows a more detailed discussion of each one of its constituent modules. Turning, at first, to the "Convert to Segment Format" modules (41 and 51), they, as specified before convert the different input pixel formats of the scan channel input and the reference channel input into the common segment format (intra-pixel format) which will facilitate comparison in later stages. Basically, the segment format describes each pixel by the edge(s) that pass through the pixel. A valid pixel accommodates at most one edge that traverses exactly two pixel sides. FIGS. 5A and 5B illustrate respective valid and invalid pixels. The edge is defined according the location in which it traverses the pixel side. In the example of FIG. 5A, the edge traverses pixel side 71 at a distance of about ⅖ pixel relative to the left upper-most corner and at a distance of about ⅕ pixel relative to the left lower-most corner. The pixel of FIG. 5B includes two edges and is therefore invalid.

According to the segment format, each pixel is represented in a 16-bit data structure as depicted in FIG. 5C:

Field A (bits 0–4): representing, in 5 bit resolution, the location of the first traversed pixel side;

Field B (bits 5–6): representing the number of the specified first pixel side; pixel sides are numbered 0 to 3, starting at the uppermost side and moving clock-wise;

Field C (bits 7–11): representing, in 5 bit resolution, the location of the second traversed pixel side;

Field D (bits 12–13): representing the number of the specified second pixel side;

Field E (bit 14): the polarity of the pixel; and

Field F (bit 15): designating whether the pixel includes an edge.

The example illustrated in FIG. 5A is thus represented as:

Field A (bits 0–4): 01100 (binary representation of ⅖ * 32 (approximated));

Field B (bits 5–6): 00 (binary representation of pixel side no. 0);

Field C (bits 7–11): 11001 (binary representation of ⅕ * 32 (approximated));

Field D (bits 12–13): 10 (binary representation of pixel side no. 2);

Field E (bit 14): 1 (positive polarity); and

Field F (bit 15): 1 (includes edge).

Of course, '0' in field F renders the data in all other fields redundant.

The polarity is determined according to the transition in the first pixel side, where a white to black transition is positive and a black to white transition is negative. In the example of FIG. 5B, the first pixel side is no. 0 and the transition from white to black as presented by arrow 73 is from white to black (i.e. positive).

The "Convert to segment format" module receives as an input from the reference channel a stream of pixels each represented e.g. as an 8 by 8 matrix of 1-bit-long sub-pixels, each sub-pixel being represented as either '1' or '0'. The module transforms the 8 by 8 representation into the segment pixel representation 80 as depicted in FIG. 5C.

The operation of the convert-to-segment module will now be described with reference also to FIG. 6A and FIG. 6B which show a more detailed structure of the convert to segment module.

Figure 6A:
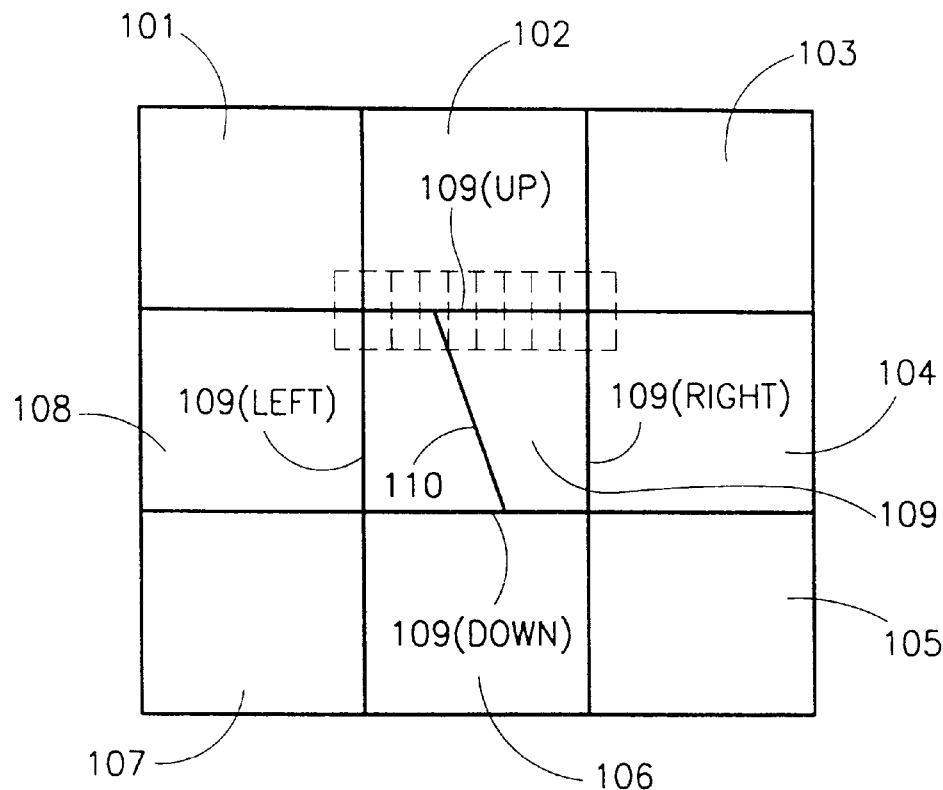
FIGS. 6a–b illustrate a scheme and a pertinent block diagram that assist in clarifying the operation of the convert-to-segment module of FIG. 4.

Thus, reference design data are fed as a stream of pixels to "span to 3×3" module 90 which arranges the numbers into a configuration of the kind depicted in FIG. 6A. The 3×3 pixels are designated in FIG. 6A as 101 to 109. As specified above, each pixel is represents as 8 by 8 matrix of sub-pixels. The sides of each pixel from among the 3×3 pixels are processed separately. Thus, for example, in order to process the top side of pixel 109, an environment that encompasses the top side thereof $109^{up}$ is captured. More specifically, 20 sub-pixels which consist of:

8 sub-pixels belonging to the lower most section of pixel 102;

8 sub-pixels belonging to the upper most section of pixel 109;

1 sub-pixel belonging to the lower most-right corner of pixel 101;

1 sub-pixel belonging to the upper most-right corner of pixel 108;

1 sub-pixel belonging to the lower most-left corner of pixel 103;

1 sub-pixel belonging to the upper most-left corner of pixel 104;

are transferred to UP look-up-table (LUT) 91 which provides as an output indication of the exact location where edge 110 traverses the top side of pixel 109 as well as the polarity value.

The right side $109^{right}$, the left side $109^{left}$ and the down side $109^{down}$ of pixel 109 are, likewise, processed utilizing light LUT 92, left LUT 94 and down LUT 93, respectively, so as to identify the other end of edge 110 which traverses the down side of pixel 109. Using logic 95, the so obtained edge is now represented in compliance with the segment pixel data structure of FIG. 5C.

Generally speaking, the convert to segment module (41 in FIG. 4) performs the following computational steps expressed in pseudo code:

(i) span the input data to 3*3 representation;

(ii) for each pixel side:

(1) using the sub-pixel side values, determine whether or not an edge traverses the pixel side and if in the affirmative determine the corresponding location and polarity;

(iii) if the number of traversed sides>2, then output=0 (signifying an invalid pixel); otherwise update the 16-bit-long segment pixel data structure.

Figure 6B:
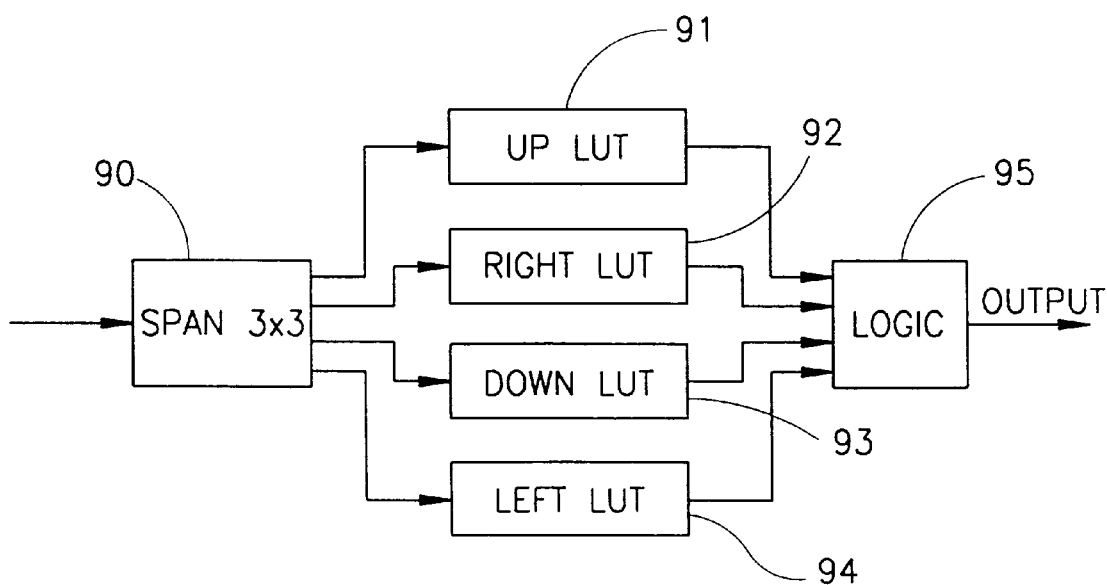

Those versed in the art will readily appreciate that the invention is by no means limited by any of the input representation of pixels, as depicted in FIG. 6A, the processing and associated circuitry as depicted in FIG. 6B and the resulting format as depicted in FIG. 5C.

The transformation of the input pixels, as received from the scan channel, into the segment format is performed mutatis mutandis in a corresponding sub-module of module 41 and will not be expounded upon herein.

The inter-pixel format (a 12-bit data structure) as delivered from the Feature detector module 54, according to one embodiment of the invention will now be described with reference also to FIGS. 7a–b.

Field A (bits 0–7): representing, in 8 bit resolution, the edge angle (0°–360°);

Field B (bits 8–9): representing edge length (i.e. distance in whole pixels to the closest corner–maximal distance=3)

Field C (bits 10–11): representing geometry type;

The geometry type signifies whether the pixel has no edges i.e. empty pixel i.e. indicative of a reticle surface (00 in binary representation), constitutes an edge (01 in binary representation), or constitutes a so called complicated geometry e.g. a corner (10 in binary representation).

A simplified illustration is depicted in FIG. 7A and serves for understanding the operation of the feature detector 54. According to one embodiment of the invention, an environment of e.g. 7 by 7 pixels is spanned with each pixel represented as '1' if it stands for 'white' and '0' if it stands for 'black'. The initialization of the matrix is performed a priori e.g. by retrieving data from the design database. The 7 by 7 matrix is then analyzed e.g. in directions prescribed by rectangular 111 and 112. The series of '1's that are depicted for illustrative purposes suggests that the edge of pixel 113 is at angle of 90°. This value is assigned to the 8 bit of field A as depicted in FIG. 7B. Of course, the analysis is not bound to the two directions depicted in FIG. 7A, and any desired direction is applicable.

The length of the edge (to the closest corner) may, likewise, be determined.

Thus, for example the series of '1s' is interrupted by an '0' (114), and accordingly the edge length associated with pixel 113 is 3. This value is assigned to the 2-bit-long field B (i.e. maximum length 3) of the feature pixel data structure depicted in FIG. 5C. In a similar manner, it is determined that the geometry of pixel 113 is edge and accordingly the value 01 is assigned to field C of the feature pixel data structure depicted in FIG. 5C.

The various values assigned to the feature pixel data structure are obtained by analyzing not only the pixel itself (113) but also the neighbors thereof, and accordingly the feature pixel data is referred to as inter-pixel data.

The input to the feature detector, the operation thereof as explained with reference to FIG. 7A, and the resulting feature pixel data structure as depicted schematically in FIG. 7B, are, of course, only one possible realization and the invention is by no means bound by these specific examples.

Having determined the inter and intra pixel data, it is now required to match between the two, i.e feature data as derived from feature module 54 and segment data as delivered from the convert to segment module 41 (in the scan channel). To this end, the match module receives a stream of 16-bit-long intra pixel data delivered from the "Match segment to feature" module and a stream of 12-bit-long inter-pixel data delivered from the feature detector module 51. The output is a sequence of 29 bit-long data units consisting each of 16-bit-long intra-pixel, 12-bit-long inter-pixel data and 1 bit signifying match/no-match status.

Attention is now directed to FIG. 8, which serves for describing the operation of the matcher module 42 or 52. The input to the matcher module is an intra-pixel 16-bit-long data constituent that pertains to a given pixel as delivered from the convert to segment format module 41. The matcher module further receives inter-pixel 12-bit-long feature pixel data as delivered from the feature detector module 54.

Since the data provided from the feature detector module 54 is only approximately synchronized with those delivered from the convert to segment module 41, a given 16-bit-long pixel segment constituent will actually reside only in the vicinity of its corresponding 12-bit-long feature pixel constituent. For each segment pixel constituent, a series of e.g. 49 feature pixel constituents are accumulated and arrayed into an e.g. 7 by 7 matrix as depicted in FIG. 8. Some of the 49 feature pixels slightly precede (i.e. were delivered before) the segment constituent while others are slightly delayed (i.e. delivered after) with respect thereto. It is assumed, with a high degree of confidence, that the feature pixel that matches the segment pixel in one of the specified 49 pixels since, as explained before, some (albeit not full) degree of synchronization exists.

The 7 by 7 matrix 121 contains feature pixel 122 which is delivered simultaneously (hereinafter simultaneous feature pixel) with the segment pixel under question. This, however, does not necessarily entails that the simultaneous feature pixel matches the segment pixel under question.

The operation of the matcher module includes performing the following operation with respect to each one of the feature pixels:

comparing the edge angle (bits 0–7) thereof to the edge angle of the segment pixel. The latter is readily derived from fields A–D of the segment pixel data structure. Whenever required, the edge data may be retrieved also form segment pixel data of neighboring pixels. In this connection it should be noted that whilst the intra-pixel edge angle unit is determined solely on the basis of one pixel, the value that is assigned to the "angle" field in the feature pixel takes into account not only the edge portion that resides in the pixel itself but also the portion of the edge that resides in neighboring pixels (field A in the feature pixel data structure). It is accordingly appreciated that the edge angle data in the feature pixel are normally more accurate than that of the intra-pixel data. More specifically, if the difference between the so compared edge angles is under a threshold the feature pixel is marked as a potential matching constituent.

In this connection it should be noted that a different threshold may be applied to a different feature pixel, e.g. one threshold for a pixel that resides in the vicinity of a corner and another threshold for a pixel is remote with respect to the corner.

Having marked all the feature pixels that passed the angle matching test, the pixel which is eventually selected is the one that is the closest to the simulations feature pixel (122 in FIG. 8). One possible approach for determining the threshold is, as shown in FIG. 8, to divide matrix 121 into slices that constitute, each, a square (123 to 126), with square 123 being the inner most square and square 126 constituting the outer-most square.

Assuming, for example, that feature pixels 130, 131 and 132 passed the specified test then, of course, feature pixel 131 is discarded (as it resides in the outer-most square), and from among the feature pixels 130 and 132 various decision criteria may be used, e.g. the one that is the closest to a corner (determined according to the value in field B thereof).

Should none of the 7×7 feature pixels match the segment pixel, then a "no match" bit is set. The latter scenario may occur e.g. in the case that a dust particle has adhered to the reticle with the inevitable consequence that the reference feature pixel data does not match the inspected segment pixel data.

Of course, the criteria used by the matching module, as specified herein, are not binding and modified or different criteria may be used. Thus, by way of non-limiting example, it is not obligatory to utilize a threshold, which depends on the distance to a corner.

Turning now to FIG. 9, it illustrates a generalized schematic illustration of a state machine module, of the kind forming sub-modules 43[(1)] or 53[(1)].

Generally speaking, the goal of the state machine is to measure line width between opposite edges which meet a given criterion (as will be explained in more detail below). The measured line widths are expressed in terms of the number of whole pixels and a sub-pixel units (in, e.g. a 5-bit-long boundary), if applicable.

According to the invention, the hardware module that realizes the line width measurement is based on the concept that it is not necessary to "accumulate" the entire relevant environment in order to conduct line width measurements, but rather it is sufficient to accumulate only relevant information. This approach facilitates the utilization of generic hardware which is capable of measuring in real time linewidths at high resolution (thereby obtaining a high degree of accuracy) essentially irrespective of the length of the measured distance.

According to one conventional approach (see for example FIG. 10 taken from the Kikuo er al. patent), the entire environment that encompasses the measured line width (i.e. opposite edges and all the pixels interposed between them) is accumulated before the line width is determined. This approach imposes constraints on the hardware complexity, i.e. it is required to process, in real-time, a large volume of data for measuring the line width. In order to cope with this limitation the resolution of the measurement must be substantially reduced, thereby drastically reducing the accuracy of the resulting line width. By way of example, a pixel, according to this prior art technique, is represented by one or at most a few sub-pixels, as compared to a very fine partition of the pixel into many sub-pixels according to the present invention which enables one to obtain the line width within a resolution of, say ⅟32 of a whole pixel.

As illustrated in FIG. 9, the line width calculation is performed by utilizing a state machine module. Thus, state machine 140 includes, generally, states 141 standing for "reset", state 142 standing for "negative" and state 143 standing for "positive".

During operation, data delivered from the matcher module (i.e. 12-bit long feature pixel data, 16-bit-long segment pixel data, and 1 bit match/no-match indication) is fed to each one of the line width calculation modules $43^{(1)}$ to $43^{(4)}$. For simplicity of explanation, the following description focuses only on the "Horizontal measurement" sub-module $43^{(1)}$. Nevertheless, the description below applies to the remaining sub-modules. For the purpose of line width calculation the horizontal state machine analyzes serially the pixels in the left to right direction.

Thus, the state machine starts at state "reset" 141 and checks the left most pixel in order to ascertain whether it is an opening edge. This may be obtained, e.g. by ascertaining whether the contents of the geometry field (C) in the feature pixel data structure is an edge, and if in the affirmative, determining whether the angle specified in the angle field (A) complies with the processing direction (currently horizontal). The latter condition may be e.g. edge angle deviation of $\pm\alpha°$ with respect to the processing direction. In the case that the latter condition is also met, the edge is announced as an opening edge, otherwise it does not constitute an opening edge. Those versed in the art will readily appreciate that the criteria prescribed herein for determining an opening edge are only one out of many possible variants.

If the pixel under inspection does not constitute an edge, the next pixel is examined and the state machine remains in the reset state (arrow 144). If, on the other hand, the specified bit indicates that the pixel under inspection is an edge, it signifies that an opening edge has been encountered and it is now required to ascertain whether the opening edge is negative or positive (i.e. a transition from white-to-black or black-to-white, respectively). This is easily determined in accordance e.g. with the angle field in the feature pixel data structure (i.e. according to whether it exceeds or drops below 180°). Having checked whether the edge under question is negative or positive, control is transferred to state 143 (P) through arrow 149, or to state 142 (N) through arrow 150, which the case may be.

The required parameters of the opening edge, such as edge angle (derived from bits 0–7 of the feature pixel constituent), the opening edge length (derived from bits 8–9 of the feature pixel constituent), the sub-pixel fraction, (following the opening edge) that is to be summed to the measured line width, and possibly other data are recorded in state registers for future use.

There now commences a line width measurement sequence wherein each pixel is successively examined and in the case that it is an empty pixel (i.e. having a '00' value in the geometry type field of the feature pixel), the line width measurement counter is incremented. As long as empty pixels are encountered the state machine remains in its present state (P through arrows 147, or N through arrow 148, which the case may be), and the counter is successively incremented.

When an ending edge is encountered, it is first examined to ascertain whether it is an opposite edge vis-a-vis the opening edge (i.e. for current P state, a negative edge is sought; for current N state a positive edge is sought). If an opposite edge is encountered, control is transferred to the opposite polarity state (from N to P through arrow 152, or from P to N through arrow 153). The state machine outputs the number of whole pixels as accumulated in the counter (6-bit-long) and calculates sub-pixel values depending upon the opening and closing edge location within a pixel, using to this end fields A–D in the segment pixel data structure.

The angle of the closing edge is also recorded as well as other parameters that pertain to measurement quality grading.

The state machine is further capable of handling exceptional events, e.g. if a corner (or other complex geometry) has been encountered before detection of closing edge. Other abnormal events include a very long distance (in the specific example under consideration over 64 pixels), or a pixel with non matching segment and feature constituents. Other abnormal events in lieu or in addition to those specified above are, of course, also applicable.

In response to exceptional events of the kind described above, control is transferred to either the reset state (through arrow 145 or 146 depending on the current state of the state machine), for commencing a new opening edge search. Alternatively, the machine may remain in its current state, e.g. in the case that after a P polarity opening edge another P polarity edge is encountered. Since the latter cannot constitute an ending edge, the machine stays in P state, the liner-width counter is reset and the ending edge search is resumed.

Those versed in the art will readily appreciate that the specific state configuration as depicted in FIG. 9, is a simplified, non binding, configuration which is presented for ease of explanation. The invention is by no means bound by the configuration and operation of the state machine that is depicted in FIG. 9.

The underlying advantage of using distance measurements of this kind is that the necessity to keep the entire relevant environment is obviated. More specifically, when the distance measurement is finalized (after encountering the closing edge that duly corresponds the opening edge), the environment that includes the opening edge as well as all the interim pixels is not available and has not been stored. The only data that are stored are the data relevant for finalizing the distance measurement and which were accumulated during the processing (e.g. opening edge angle, the number of empty pixels that were encountered before detecting closing edge).

This approach enables one to use generic hardware for measuring line widths over a relatively wide range (in the example under consideration from 1 to 64 pixel length) whilst maintaining very high resolution (by this specific example 1/32 pixel) and meeting real-time constraints.

The state machine delivers as an output the following 21-bit-long data structure with respect to each measured line width:

Field A: the measured distance between two opposite edges, expressed as a number of whole pixels in 6-bit-resolution, i.e. from 1 to 64 "whole" pixels;

Field B: the supplementary distance measurement expressed as a fraction of a pixel in 5-bit-resolution, i.e. 1/32 to 31/32 length of a whole pixel;

Field C: a measurement quality grading expressed in 8-bit resolution. The latter is broken down into four sub-groups, 2-bit-long each, as follows:
proximity of the edges to a corner;
"the extent of parallelism of the opposite edges";
"the distance itself";
"line orientation";

Field D: the polarity of the measured distance (e.g. the transition from white to black, or vice versa of the closing edge;

Field E: status, standing for successfully ending line width measurement, or not.

Each data unit that is delivered from the state machine module refers to a given measured distance and is delivered independently from each one of the horizonal, vertical, slash and back-slash sub modules in the scan channel ($43^{(1)}$, $43^{(2)}$, $43^{(3)}$ and $43^{(4)}$, respectively). The same applies to the horizontal, vertical, slash and back-slash sub modules in the reference channel ($53^{(1)}$, $53^{(2)}$, $53^{(3)}$ and $53^{(4)}$, respectively). It should be noted that no use is made in the 8 bit grading data that is delivered from the reference channel.

Turning now to the generation of quality grading (which by this specific example forms part of the line width measurement device), this may simply involve applying the pertinent data of the so obtained line width to a given LUT (not shown in the Figures) which assigns grading according to the input provided thereto.

Attention is now directed to the average module 44, which as shown in FIG. 4a is coupled solely to the scan channel and is divided into four sub-modules $44^{(1)}$, $44^{(2)}$, $44^{(3)}$ and $44^{(4)}$.

Generally speaking, the average module aims at coping with the known intrinsic edge roughness phenomenon. In accordance with the present invention, the distance data as delivered from the state machine module are averaged giving rise to a 3-long-chain and a 5-long chain value. Basically, a 3-long-chain average value is based on the average distance measurement of three, preferably but not necessarily, consecutive measurements. The grading of the 3-long-chain average (8-bit-long measurement quality grading) is taken to be e.g. the "weakest" link in the chain, i.e. the one having the lowest grading from among the three grading.

The so obtained average may be subject to an additional chaining sequence so as to bring about a 5-long-chain average.

Figure 11:
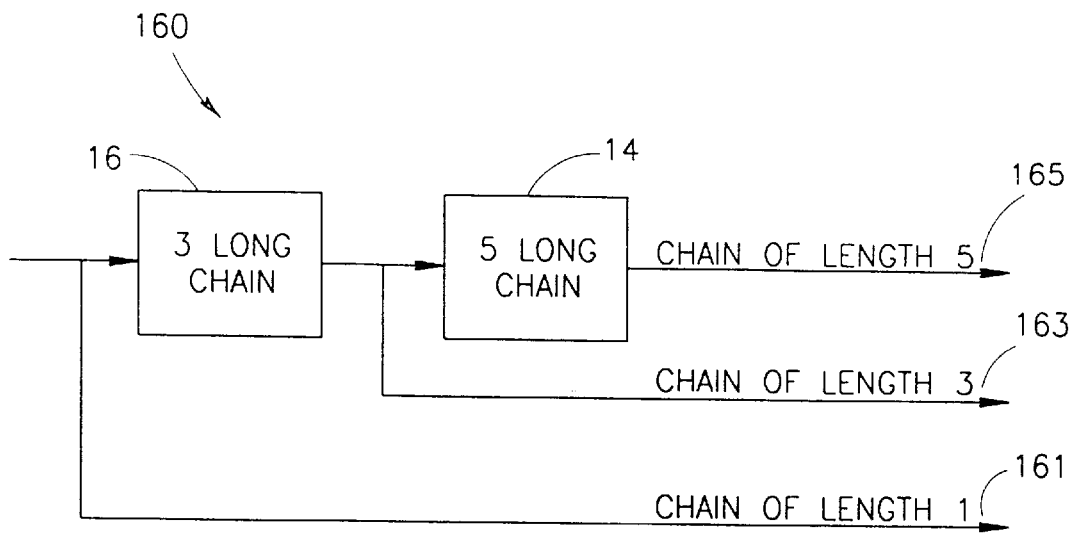
FIG. 11 shows a schematic block diagram of an average measurement module in a detector of FIG. 4.

A generalized block diagram of a typical "average measurement module" (constituting each one of the average measurement sub-modules $44^{(1)}$, $44^{(2)}$, $44^{(3)}$ and $44^{(4)}$) is depicted in FIG. 11 and designated as 160.

As shown, the data delivered from the corresponding state machine sub-modules are transmitted as is to output port 161 (designated in FIG. 11 as a chain of length l). The same input is fed to the 3-long chain module 162 giving rise, in the manner specified, to a 3-long-chain data unit which is then outputted to output port 163. The latter output is fed to the succeeding 3-long chain module 164 giving rise to a 5-long-chain data unit which is then outputted to output port 165.

The average module described herein is not bound by the specific examples described above. Thus, the utilization of 3 and 5 long chains are of course only an example. If desired, the same number or a different number of chains with the same number or different number of links may be utilized. Moreover the edge roughness operator does not have to undergo averaging and by way of a non limiting example, weighted averaging may be used.

The last module 60 performs a comparison between respective measurements delivered from the scan channel processing and those delivered from the reference channel processing. Obviously, the comparison is performed with respect to each sub-module separately. Thus, sub-module $61^{(1)}$ is fed with measurement data from sub-module $53^{(1)}$ and also with the 1-chain-long data as delivered from the average module $44^{(1)}$) and provides an indication as to whether the discrepancies are tolerated or, otherwise, constitute a defect. As explained above, the latter decision is based inter alia on the respective measurement quality grading data.

Sub-module $61^{(2)}$ performs a similar task, with respect, however, to the 3-long-chain input delivered from average module $44^{(1)}$.

Sub-module $61^{(3)}$ performs a similar task, with respect, however, to the 5-long-chain input delivered from average module $44^{(1)}$.

The outputs of modules $61^{(1)}$, $61^{(2)}$ and $61^{(3)}$ are fed to combiner unit $69^{(1)}$, which combines the data giving rise to a defect/no-defect indication, a typical yet or non exclusive criterion being: all the comparators ($61^{(1)}$, $61^{(2)}$ and $61^{(3)}$) reported a no defect. This entails a "no defect" indication at line $70^{(1)}$, otherwise a defect indication is reported in line $70^{(1)}$.

Sub-modules $62^{(1)}$, $62^{(2)}$ and $62^{(3)}$; $63^{(1)}$, $63^{(2)}$ and $63^{(3)}$ and $64^{(1)}$, $64^{(2)}$ and $64^{(3)}$ perform, independently, a similar task with respect to the respective "vertical", "slash" and "backslash" measurements.

Turning now to the specific description of the horizontal comparator module $61^{(1)}$ (hereinafter 1-long-chain horizontal comparator), it receives, as specified before, 13 bit distance data (6 bit indicating the number of whole pixels and 5 bit indicating the pixel fraction, 1 bit for polarity and 1 bit for status) fed through input line M (see FIG. 4b). It further receives corresponding 21 bit data from the average sub module $44^{(1)}$ through line C.

The 8-bit quality grading data provide (by utilizing a LUT—not shown) an appropriate threshold and the 1-chain-long horizontal comparator compares between the 11 bit reference distance data and the 11 bit scan distance data (1-chain-long) and in the case that the difference does not exceed a threshold the scanned distance is classified as valid. If, on the other hand, the difference exceeds a threshold then the measured distance is classified as "defect" and an the result is fed to combiner $69^{(1)}$ as explained above.

It may well be the case that the reference data provided through line M is not fully synchronized with that provided through line C. In order to cope with this problem a similar technique of the kind employed in matcher 42 may be employed, to wit:

data provided from the reference channel is locally spanned, e.g. to 7 by 7 13-bit data units. Each of the specified 49 13-bit-values is compared against the counterpart 13-bit-data as fed through line C (the scan channel), and in the case that even one comparison succeeds (i.e. the difference drops below the threshold) a "no defect" indication is fed to the combiner; otherwise, all the relevant comparisons (i.e comparisons of pixels having the status bit set and having the same polarity) bring about a difference that exceeds the threshold, and a "defect" indication is fed to the combiner.

An important finding according to one aspect of the invention is that the specified threshold is not fixed and is contingent upon the specified measurement quality grading.

Another important findings according to yet another aspect of the invention resides in the RTLEB sub-module which aims at filtering out discrepancies between the reference design data due to artefacts such as inherent distortions introduced to the image of the inspected reticle by the acquiring optical system. The static distortions e.g. those introduced by the optical system, may be evaluated in advance and compensated for in the comparison stage or before.

Figure 12:
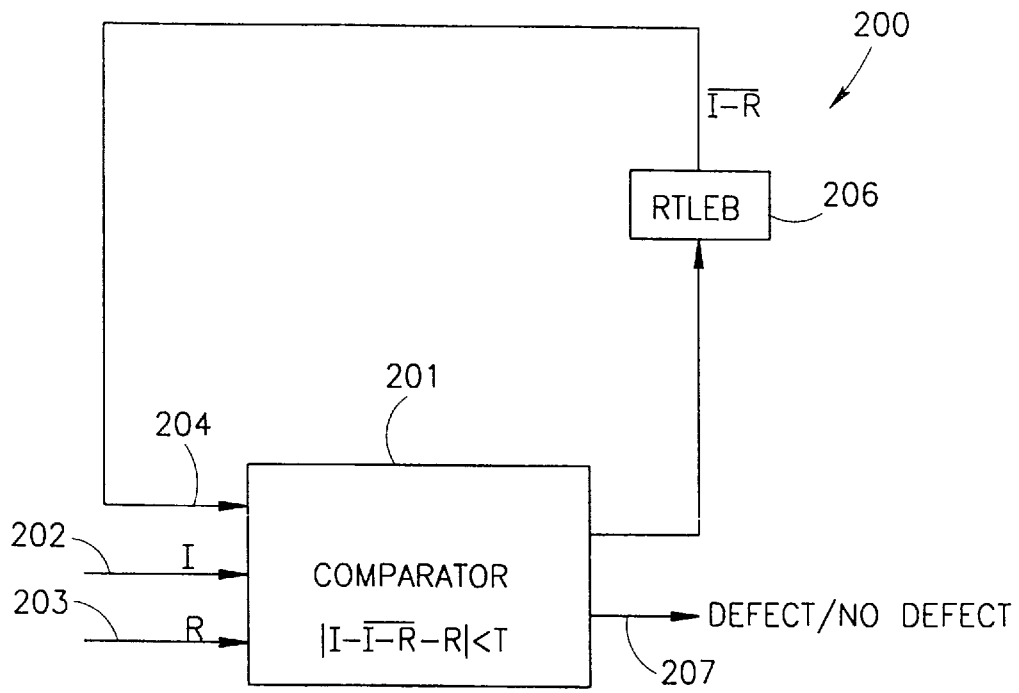
FIG. 12 shows, schematically, a generalized block diagram of a real-time local environment bias (RTLEB) module in a detector of FIG. 4.

For a better understanding of the foregoing, attention is directed also to FIG. 12, showing a typical RTLEB module 200 (e.g. $65^{(1)}$ in FIG. 4b) which operates in conjunction with comparator sub-module 201 (e.g. $61^{(1)}$ in FIG. 4b).

Thus, the data from the average module (i.e. 1-long-chain) is fed to input 202 (I—standing for inspected) and the reference data is fed to input 203 (R—standing for reference). As shown the comparator is fed also with input from the RTLEB module 204.

The variable errors are of dynamic (and local) nature. Representative, yet not exclusive, examples of the latter are drift in the optical system which introduces local error to the reticle area that is currently or has just recently been inspected. Another example concerns inherent manufacturing processes in which different areas of the reticle are produced at different resolutions. The varying resolution may affect the gray level value of the acquired images and may, of course, adversely affect the comparison.

Whilst the issue of the dynamic (and local) nature of the errors is well known, it has not been addressed, as yet, and the prior art has not been able to successfully cope with it.

According to the invention the average local contribution (hereinafter local constant) error is filtered out in the comparison sequence since, it is likely to arise from a local factor (such as different resolution, drift in optics etc.).

It should be noted that according to the invention the need to identify the exact phenomena that contributed to the local error is not required, but rather the constat contribution is simply discarded. Put differently the filtering technique of the invention does not attempt to analyze in depth the source of the underlying phenomena (e.g. optical drifting) which gave rise to the local error, but rather measures the local error and filters it out. This approach greatly simplifies the complexity of the hardware that is required, and enhances the ability of the system to work in real time by circumventing complicated calculations.

The actual realization according to the specific embodiment of the invention is illustrated in FIG. 12, where the average I–R value (say in a series of i recent (not necessarily continuous) measurements—i being a parameter) is calculated at sub-module 206.

The actual comparison complies, thus, with the following algorithmic expression (where T stands for threshold):

$$|I-\overline{I-R}-R|<T$$

The operation of the RTLEB sub-module $65^{(1)}$, is duplicated in sub-module $65^{(2)}$ and $65^{(2)}$, with respect, however, to respective 3-long-chain and 5-long-chain inputs delivered from average module $44^{(1)}$.

It should be noted that the general technique for compensating local errors is not necessarily bound to the embodiment depicted in FIG. 12. Thus, by way of non limiting example the value i may be changed depending upon the particular application, or, if desired, a fine tuning procedure may be applied e.g. large I–R values are disregarded and are not averaged. If desired, different averaged I–R values may be recorded for values with different polarity or with respect to only one selected polarity (with the motivation that "white" values are associated with different local errors than "black" values). If desired, a weighted average may be utilized. Other variants include compensating also for fixed errors that stem e.g. from the intrinsic distortion of the optical system. The so obtained RTLEB results, as delivered from unit 206 may be used for statistics and other analysis.

As is well known, the defect/no defect indications of measured line widths are, normally, fed to an external system (automatic, semi-automatic or manual, as the case may be) which integrates the data in order to decide whether the inspected reticle is to be classified as "pass" (i.e. operable), or "fail".

In the claims which follow, alphabetic characters and numbers used to designate claim steps are provided for convenience of description only, and do not necessarily imply any particular order of performing the steps. The same applies to the order in which elements are recited in claims directed to the detector.

The present invention has been described with a certain degree of particularity but it should be understood that various modifications and alteration may be made without departing from the scope or spirit of the invention as defined by the following claims:

What is claimed is:

1. In a system for real-time inspection of patterns formed on a base, the pattern including surfaces and edges, a detector comprising:

at least two input channels for receiving respective streams of data elements representing said patterns, each data element representing at least a surface and/or edge of said pattern in high resolution;

at least two line width measurement devices responsive to at least said respective streams of data elements, each said line width measurement device being for successively processing, in real time, said data elements in a manner that corresponds to a given direction in said patterns, so as to measure, in high resolution, line width data between two edges by executing at least the following steps: (i) detecting an opening edge, (ii) successively updating line width, and (iii) providing a line width measurement in response to detecting a closing edge; and for generating a measurement quality grading according to the geometric characteristics of the line width measurement;

at least one comparator responsive to at least the line width data delivered from said at least two line width measurement devices, for comparing said line width data and obtaining a difference therebetween, so as to generate a defect/no defect indication depending upon at least whether said difference is above or below a threshold, the threshold being determined in accordance with said measurement quality grading.

2. The detector of claim 1, wherein n (n>1) line width measurement devices each being responsive to at least respective stream of data elements, such that each one of said n line width measurement devices is capable of successively processing, in real time, said data elements in a manner that corresponds to a respective direction in said patterns, so as to measure, in high resolution, line width data between two edges.

3. The detector of claim 2, wherein said n=4, and said processing directions being respectively horizontal direction, vertical direction, slash direction and backslash direction.

4. The detector of claim 1, wherein the data element representation includes at least one of the following: edge angle with respect to a given line, edge polarity, edge length, geometry type, where the latter signifies one of at least the following categories: edge, surface or complex geometry.

5. The detector of claim 4, wherein line width measurement is provided as stipulated in (iii), if at least one condition from among a group of conditions is met, the group of conditions including:
   (a) the angle of the opening edge is deviated with respect to said direction at no more than $\pm\alpha°$;
   (b) the polarities of the closing edge and the opening edge are complementary;
   (c) no complicated geometries exist between said opening edge and said closing edge; and
   (d) said line width data does not exceed a given maximum value.

6. The detector of claim 4, wherein each one of said line width measurement devices is realized as a state machine having at least the following states: search for opening edge, count line width until closing edge is encountered.

7. The detector according to claim 1, wherein said measurement quality grading is dependent upon at least one of the following parameters:
   (a) the proximity of the edges to a corner;
   (b) the extent to which the opening and closing edges are parallel;
   (c) the measured line width; and
   (d) the angle formed by the opening edge and said direction.

8. The detector of claim 1, wherein each one of said line width measurement devices is realized as a state machine having at least the following states: search for opening edge, count line width until closing edge is encountered.

9. The detector of claim 8, wherein said state machine is further capable of handling exceptional events.

10. The system of claim 1, wherein said data element constitutes a pixel.

11. The detector of claim 1, further comprising format conversion modules coupled to said at least one input channel for converting the data element representation into a common format, and wherein each one of said line width measurement devices is adapted to operate in said common format.

12. A die to database inspection system according to claim 1, having a detector that comprises two input channels for receiving respective streams of data elements representing said patterns, each data element representing at least surface and/or edge of said pattern in high resolution; a first stream from among said streams originating from the inspected pattern formed on a reticle and a second stream from among said streams originating from an essentially defectless reference design database.

13. A die to die inspection system according to claim 1, having a detector that comprises two input channels for receiving respective streams of data elements representing said patterns, each data element representing at least surface and/or edge of said pattern in high resolution; a first stream from among said streams originating from an inspected pattern formed on a die and a second stream from among said streams originating from an inspected pattern formed on a similar die.

14. The detector according to claim 1, further comprising edge roughness means coupled to said line width measurement device.

15. In a system for real-time inspection of patterns formed on a base, the pattern including surfaces and edges, a detector comprising:
   at least two input channels for receiving respective streams of data elements representing said patterns, each data element representing at least surface and/or edge of said pattern in high resolution;
   at least two line width measurement devices being responsive to at least said respective streams of data elements, for successively processing, in real time, said data elements in a manner that corresponds to a given direction in said patterns, so as to measure, in high resolution, line width data between two edges;
   at least one comparator being responsive to at least the line width data delivered from said at least two line width measurement devices, for comparing said line width data and obtaining a difference therebetween;
   local environment biasing means generating a bias signal that depends upon a series of said differences between line width data;
   said at least one comparator generating a defect\no defect indication depending upon at least said difference and said bias value.

16. The detector of claim 15, wherein said local environment biasing means generate a bias signal which complies with the following algorithmic expression:

$$\overline{I\text{-}R}$$

where I stands for line width measurement originating from said first channel, and R stands for corresponding line width measurement originating from a second channel, said at least one comparator complies with the following algorithmic expression:

$$|I\text{-}\overline{I\text{-}R}\text{-}R|<T.$$

17. The detector of claim 15, wherein the line width data between two edges that is measured by said line width measurement device, is obtained by executing at least the following steps: (i) detecting an opening edge, (ii) successively updating line width; (iii) providing a line width measurement in response to detecting a closing edge.

18. The detector of claim 17, wherein n (n>1) line width measurement devices each being responsive to at least a respective stream of data elements, such that each one of said n line width measurement devices is capable of successively processing, in real time, said data elements in a manner that corresponds to a respective direction in said patterns, so as to measure, in high resolution, line width data between two edges.

19. The detector of claim 18, wherein said n=4, and said processing directions being respectively horizontal direction, vertical direction, slash direction and backslash direction.

20. The detector of claim 17 wherein the data element representation includes at least one of the following: edge angle with respect to a given line, edge polarity, edge length, geometry type, where the latter signifies one of at least the following categories: edge, surface or complex geometry.

21. The detector of claim 20, wherein line width measurement is provided as stipulated in (iii), if at least one condition from among a group of conditions is met, the group of conditions including:

the angle of the opening edge is deviated with respect to said direction at no more than $-\alpha°$;

(b) the polarities of the closing edge and the opening edge are complementary;

(c) no complicated geometries exist between said opening edge and said closing edge; and (d) said line width data does not exceed a given maximum value.

22. The detector according to claim 17 wherein each line width measurement device is further capable of generating a measurement quality grading associated with said line width measurement device;

said at least one comparator being further capable of generating a defect\no defect indication depending upon whether said difference is above or below a threshold, the threshold being determined in accordance with said measurement quality grading.

23. The detector according to claim 22, wherein said measurement quality grading is dependent upon at least one of the following parameters:

(a) the proximity of the edges to a corner;

(b) the extent to which the opening and closing edges are parallel;

(c) the measured line width;

(d) the angle formed by the opening edge and said direction.

24. The detector of claim 17 wherein each one of said line width measurement devices is realized as a state machine having at least the following states: search for opening edge, count line width until closing edge is encountered.

25. The system of claim 17, wherein said data element constitutes a pixel.

26. The detector of claim 17, further comprising format conversion modules coupled to said at least one input channel for converting the data element representation into a common format, and wherein each one of said line width measurement devices is adapted to operate in said common format.

27. The detector of claim 15 wherein each one of said line width measurement devices is realized as a state machine having at least the following states: search for opening edge, count line width until closing edge is encountered.

28. The detector of claim 27, wherein said state machine is further capable of handling exceptional events.

29. A die to database inspection system according to claim 15, having a detector that comprises two input channels for receiving respective streams of data elements representing said patterns, each data element representing at least surface and/or edge of said pattern in high resolution; a first stream from among said streams originating from the inspected pattern formed on a reticle and a second stream from among said streams originating from an essentially defectless reference design database.

30. A die to die inspection system according to claim 15, having a detector that comprises two input channels for receiving respective streams of data elements representing said patterns, each data element representing at least surface and/or edge of said pattern in high resolution; a first stream from among said streams originating from an inspected pattern formed on a die and a second stream from among said streams originating from an inspected pattern formed on a similar die.

31. The detector according to claim 15, further comprising edge roughness means coupled to said line width measurement device.

32. In a system for real-time inspection of patterns formed on a base, the pattern including surfaces and edges, a detector comprising:

at least two input channels for receiving respective streams of data elements representing said patterns, each data element representing at least surface and/or edge of said pattern in high resolution; the edge representation constituting an intra data element representation;

a feature data element input channel, for receiving streams of feature data elements representing said patterns, each feature data element representing at least surface and/or edge of said pattern, in high resolution, based on at least location of edges in feature data elements residing in the vicinity of said feature data element; the edge representation constituting an inter data element representation;

at least one matcher device, responsive to at least said stream of data elements and stream of feature data elements, for outputting a stream of respective matched data elements and feature data elements;

at least two line width measurement devices being responsive to at least said respective streams of matched data elements and feature data elements, for successively processing, in real time, said data elements and said feature data elements in a manner that corresponds to a given direction in said patterns, so as to measure, in high resolution, line width data between two edges;

at least one comparator being responsive to at least the line width data delivered from said at least two line width measurement devices, for comparing said line width data and obtaining a difference therebetween, so as to generate a defect\no defect indication depending upon at least said difference.

33. The detector of claim 32, further comprising local environment biasing means capable of generating a bias signal that depends upon a series of said differences between line width data;

said at least one comparator being capable of generating a defect\no defect indication depending also upon said bias value.

34. The detector of claim 33, wherein said local environment biasing means generate a bias signal which complies with the following algorithmic expression:

$$\overline{I-R}$$

where I stands for line width measurement originating from said first channel, and R stands for corresponding line width measurement originating from a second channel, said at least one comparator complies with the following algorithmic expression:

$$|I-\overline{I-R}-R|<T.$$

35. The detector of claim 32, wherein the line width data between two edges that is measured by said line width measurement device, is obtained by executing at least the following steps: (i) detecting an opening edge, (ii) successively updating line width; (iii) providing a line width measurement in response to detecting a closing edge.

36. The detector of claim 35, wherein n (n>1) line width measurement devices each being responsive to at least a respective stream of data elements, such that each one of said n line width measurement devices is capable of successively processing, in real time, said data elements in a manner that corresponds to a respective direction in said patterns, so as to measure, in high resolution, line width data between two edges.

37. The detector of claim 36, wherein said n=4, and said processing directions being respectively horizontal direction, vertical direction, slash direction and backslash direction.

38. The detector of claim 35, wherein the data element representation includes at least one of the following: edge angle with respect to a given line, edge polarity, edge length, geometry type, where the latter signifies one of at least the following categories: edge, surface or complex geometry.

39. The detector of claim 38, wherein line width measurement is provided as stipulated in (iii), if at least one condition from among a group of conditions is met, the group of conditions including:
 (a) the angle of the opening edge is deviated with respect to said direction at no more than $\pm\alpha°$;
 (b) the polarities of the closing edge and the opening edge are complementary;
 (c) no complicated geometries exist between said opening edge and said closing edge; and
 (d) said line width data does not exceed a given maximum value.

40. The detector according to claim 35, wherein each line width measurement device is further capable of generating a measurement quality grading associated with said line width measurement device;
 said at least one comparator being further capable of generating a defect\no defect indication depending upon whether said difference is above or below a threshold, the threshold being determined in accordance with said measurement quality grading.

41. The detector according to claim 40, wherein said measurement quality grading is dependent upon at least one of the following parameters:
 (a) the proximity of the edges to a corner;
 (b) the extent to which the opening and closing edges are parallel;
 (c) the measured line width;
 (d) the angle formed by the opening edge and said direction.

42. The detector of claim 35, wherein each one of said line width measurement devices is realized as a state machine having at least the following states: search for opening edge, count line width until closing edge is encountered.

43. The system of claim 35, wherein said data element constitutes a pixel.

44. The detector of claim 35, further comprising format conversion modules coupled to said at least one input channel for converting the data element representation into a common format, and wherein each one of said line width measurement devices is adapted to operate in said common format.

45. The detector of claim 32, wherein each one of said line width measurement devices is realized as a state machine having at least the following states: search for opening edge, count line width until closing edge is encountered.

46. The detector of claim 45, wherein said state machine is further capable of handling exceptional events.

47. A die to database inspection system according to claim 32, having a detector that comprises two input channels for receiving respective streams of data elements representing said patterns, each data element representing at least surface and/or edge of said pattern in high resolution; a first stream from among said streams originating from the inspected pattern formed on a reticle and a second stream from among said streams originating from an essentially defectless reference design database.

48. A die to die inspection system according to claim 32, having a detector that comprises two input channels for receiving respective streams of data elements representing said patterns, each data element representing at least surface and/or edge of said pattern in high resolution; a first stream from among said streams originating from an inspected pattern formed on a die and a second stream from among said streams originating from an inspected pattern formed on a similar die.

49. The detector according to claim 32, further comprising edge roughness means coupled to said line width measurement device.

50. In a system for real-time inspection of patterns formed on a base, the pattern including surfaces and edges,
 a detector comprising:
  scan input channel for receiving stream of pixels representing scan patterns, each pixel representing at least surface and/or edge of said pattern in high resolution;
  reference input channel for receiving stream of pixels representing patterns originating from design data base, each pixel representing at least surface and/or edge of said pattern in high resolution; the edge representation constituting an intra pixel representation;
  a feature pixel input channel, for receiving streams of feature pixels representing patterns originating from design data base, each feature pixel representing at least surface and/or edge of said pattern, in high resolution, based on at least location of edges in feature pixels residing in the vicinity of said feature pixel; the edge representation constituting an inter pixel representation;
  scan matcher device responsive to at least said stream of pixels representing scan patterns and stream of feature pixels, for outputting a stream of respective matched scan pixels and feature pixels;
  reference matcher device responsive to at least said stream of pixels representing patterns originating from design database and stream of feature pixels, for outputting a stream of matched reference pixels and feature pixels;
  at least one scan line width measurement device being responsive to at least said streams of matched scan pixels and feature pixels for successively processing, in real time, said pixels in a manner that corresponds to a given direction in said patterns, so as to measure, in high resolution, line width data between two edges by executing at least the following steps: (i) detecting an opening edge, (ii) successively updating line width; (iii) providing a line width measurement in response to detecting a closing edge;
  at least one reference line width measurement device being responsive to at least said streams of matched reference pixels and feature pixels for successively processing, in real time, said pixels in a manner that corresponds to a given direction in said patterns, so as to measure, in high resolution, line width data between two edges by executing at least the following steps: (i) detecting an opening edge, (ii) successively updating line width; (iii) providing a line width measurement in response to detecting a closing edge;

edge roughness means coupled to said at least one scan line width measurement device, for averaging said line width data;

at least one comparator being responsive to at least the line width data delivered from said reference line width measurement device and to line width data and average line width data for obtaining a difference therebetween;

at least one local environment biasing means capable of generating a bias signal that depends upon a series of said differences between line width data;

said at least one comparator being capable of generating a defect\no defect indication depending upon at least said difference and said bias value.

51. In a system for real-time inspection of patterns formed on a base, the pattern including surfaces and edges, a method for detecting defects in said patterns, comprising:
   (a) receiving, in at least two input channels, respective streams of data elements representing said patterns, each data element representing at least a surface and/or edge of said pattern in high resolution;
   (b) processing, in real time, said data elements in a manner that corresponds to a given direction in said patterns, so as to measure, in high resolution, line width data between two edges by executing at least the following steps:
      (i) detecting an opening edge,
      (ii) successively updating the line width;
      (iii) providing a line width measurement in response to detecting a closing edge;
   (c) generating a measurement quality grading according to the geometric characteristics of the line width measurement; and
   (d) comparing said line width data and obtaining a difference therebetween, so as to generate a defect/no defect indication depending upon at least whether said difference is above or below a threshold determined in accordance with the measurement quality grading.

52. In a system for real-time inspection of patterns formed on a base, the pattern including surfaces and edges, a method for detecting defects in said patterns, comprising:
   (a) receiving, in at least two input channels, respective streams of data elements representing said patterns, each data element representing at least surface and/or edge of said pattern in high resolution;
   (b) processing, in real time, said data elements in a manner that corresponds to a given direction in said patterns, so as to measure, in high resolution, line width data between two edges;
   (c) comparing said line width data and obtaining a difference therebetween;
   (d) generating a bias signal that depends upon a series of said differences between line width data; and
   (e) generating a defect\no defect indication depending upon at least said difference and said bias value.

53. In a system for real-time inspection of patterns formed on a base, the pattern including surfaces and edges, a method for detecting defects in said patterns, comprising:
   (a) receiving, in at least two input channels, respective streams of data elements representing said patterns, each data element representing at least surface and/or edge of said pattern in high resolution; the edge representation constituting an intra data element representation;
   (b) receiving streams of feature data elements representing said patterns, each feature data element representing at least surface and/or edge of said pattern, in high resolution, based on at least location of edges in feature data elements that reside in the vicinity of said feature data element; the edge representation constituting an inter data element representation;
   (c) outputting a stream of respective matched data elements and feature data elements;
   (d) processing, in real time, said data elements and said feature data elements in a manner that corresponds to a given direction in said patterns, so as to measure, in high resolution, line width data between two edges; and
   (e) comparing said line width data and obtaining a difference therebetween, so as to generate a defect\no defect indication depending upon at least said difference.

* * * * *